L. DAY.
Churn.
No. 26,970.
Patented Jan'y 31, 1860.
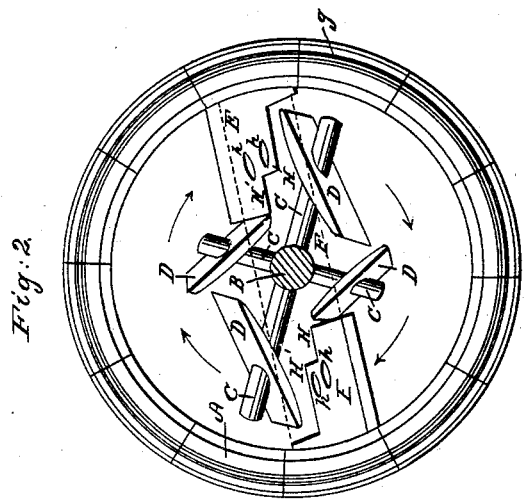
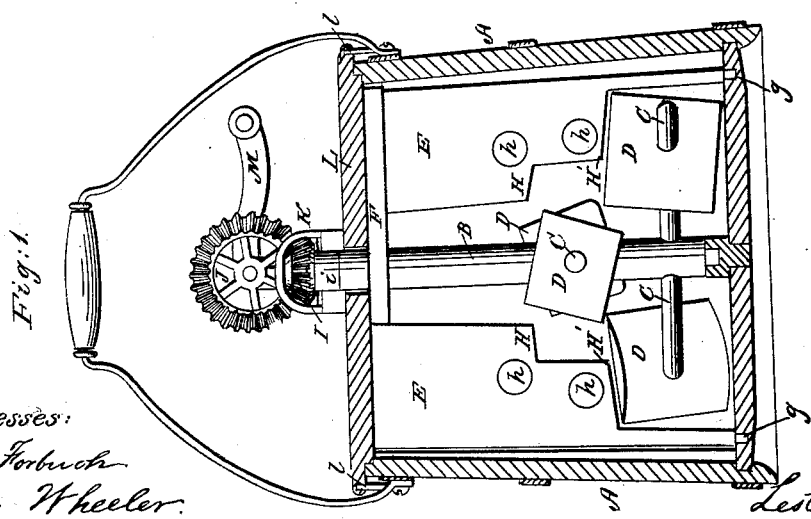
Witnesses:
W H Forbush
A M Wheeler
Inventor:
Lester Day

UNITED STATES PATENT OFFICE.

LESTER DAY, OF BUFFALO, NEW YORK.

CHURN.

Specification of Letters Patent No. 26,970, dated January 31, 1860.

*To all whom it may concern:*

Be it known that I, LESTER DAY, of the city of Buffalo, county of Erie, and State of New York, have invented certain new and useful Improvements in Churns; and I do hereby declare that the following is a full, clear, and exact description of the construction and operation of the same, reference being had to the accompanying drawings, and the letters of reference marked thereon, in which—

Figure 1 is a vertical section of my improvement. Fig. 2 is a plan of same.

A is the tub or barrel into which the milk or cream is placed. B is a perpendicular shaft to which the dash blades are attached the lower end turns in a foot step (b) in the bottom of the barrel (A).

C are arms passing through the shaft (B) at right angles to the shaft and to each other and extending equally on each side of the shaft. The upper arms are made shorter than the lower arms, so that the upper dash blades, can revolve under the shoulders H, while the lower arms are made long, so that the lower dash blades can revolve under the shoulders H'.

D are the dash blades. They are rectangular in form and are placed diagonally upon their respective arms, the arms passing through them at or near their centers. They are adjustable on their respective arms, and may be moved outwardly and inwardly and placed at unequal distances from the shaft, so that the one will not follow in the track of the other, thereby serving more effectually to divide and break up the body of the cream and segregate the butter.

E are two breakers placed diametrically opposite each other extending from the top to the bottom of the churn. They are permanently connected at the top to the cross piece (F) and set in holes or sockets in the bottom as shown at (g) so that they together with the cross piece may be removed at pleasure to clean. They set off from the side of the barrel (A) and stand slightly inclined from a vertical line. They have two shoulders H H' under which the dash blades revolve. Holes h are also made in them through which a portion of the milk is thrown. I bevel pinion placed in the upper end of the shaft (B). The end of the shaft is made square and fits into a socket (i) so that the pinion may be removed from the shaft, and the shaft and dashes taken out. J bevel wheel which gears with bevel pinion I. K gear frame secured to the cover L which is fastened to the sides of the churn as shown by the hooks (l). M crank by which motion is given to the dash blades. The action of the dash blades and breakers upon the milk or cream is as follows: Motion being given to the dash blades by means of the crank and gearing, in the direction of the arrows, they will by their diagonal position on the arms throw the cream or milk outward against the side of the barrel and against the breakers, part passing through the space between the breakers and the side of the barrel, and part being thrown through the holes (h) in the breakers and part being thrown back by the breakers meeting these currents causing a concussion between them, and part being thrown by the breakers toward the center. The dash blades may also be turned on their respective arms so that they will give the milk or cream an upward as well as outward motion, or by reversing the motion of the dash blades throw it inward and downward. This action of the dash blades will separate the "butter" from the cream in the shortest possible time and with the greatest ease to the operator.

What I claim as my invention and desire to secure by Letters Patent is—

1. The breakers E, having shoulders or offsets H and H', and permanently connected to the cross piece F, so as to be removable therewith, and extending from the cross piece to the bottom of the churn, for the purposes and substantially as herein described.

2. The adjustable dash blades D, placed diagonally on the arms c and arranged to operate with the breakers E for the purposes and substantially as herein set forth.

LESTER DAY.

Witnesses:
A. M. WHEELER,
W. H. FORBUSH.